Feb. 19, 1952 E. C. FURMAN 2,586,640
LEAK SEALING DEVICE
Filed June 25, 1947
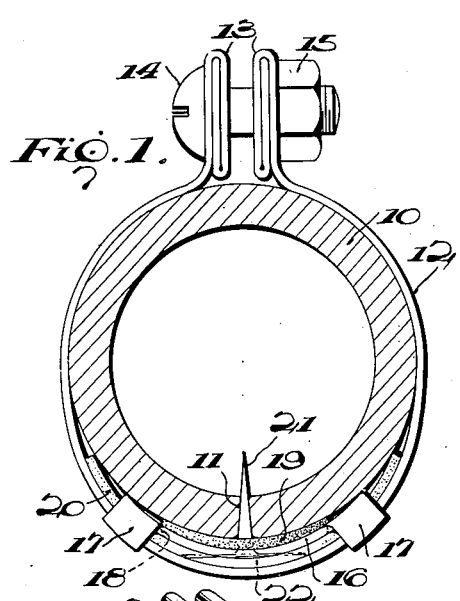
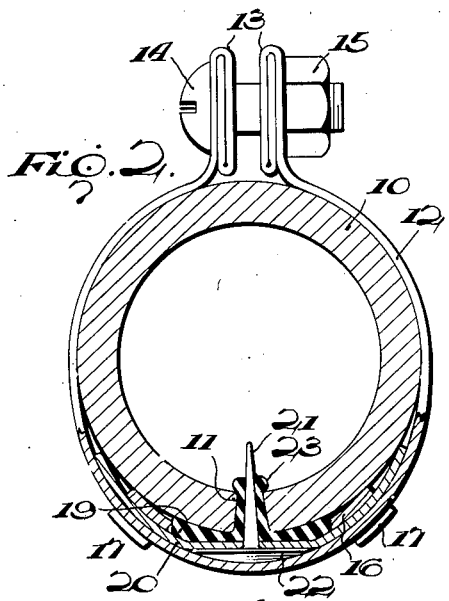
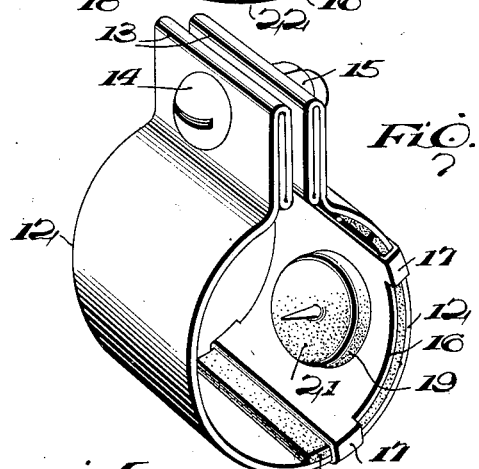
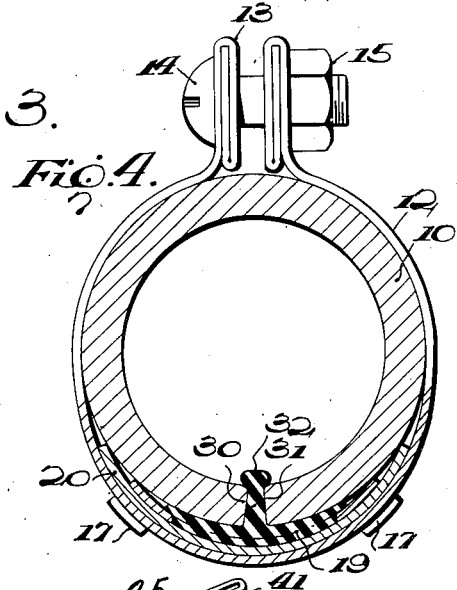
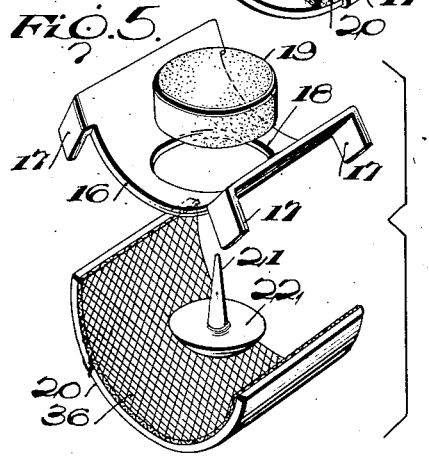
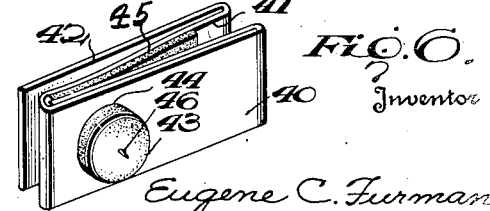
Inventor
Eugene C. Furman
By Cameron, Kerkam & Sutton
Attorneys Patented Feb. 19, 1952

2,586,640

UNITED STATES PATENT OFFICE 2,586,640

LEAK SEALING DEVICE

Eugene C. Furman, Hampton, Va.

Application June 25, 1947, Serial No. 756,959

19 Claims. (Cl. 138—99)

This invention relates to leak sealing devices, and more particularly to devices for sealing leaks in pipes, tanks and other cylindrical containers of fluid.

It has heretofore been proposed to provide a device for sealing leaks in pipes that comprises a generally conical piece of resilient material which may be located with the apex of its cone disposed in or at the aperture at which the leak is occurring and held in position by means of a clamp embracing the pipe. It has also been proposed to provide a device for sealing leaks in the form of a pad of resilient material that carries an inset of vulcanizable material that may be disposed over the aperture at which the leak is occurring and held in position by a clamp embracing the pipe.

Devices of the foregoing character are generally difficult to apply because of the necessity of holding the cone-shaped piece or pad in position on the pipe in alignment with the aperture through which the leak is occurring and until the clamp is tightened sufficiently to fix the leak sealing element in position against displacement. Furthermore, devices of this type are difficult of application when the leak occurs on the blind side of a pipe so that the proper centering of the leak sealing element with respect to the leak cannot be observed, or in fact under any circumstance where because of darkness, difficult accessibility, etc., the exact location of the leak is difficult or impossible to observe. The necessity for holding such elements in position while the clamp is applied also makes it uncomfortable if not impossible to apply such leak sealing elements to very hot pipes. Additionally, except when the aperture through which the leak is occurring is relatively large, the sealing effected by such leak sealing elements is entirely external of the pipe, as even the apex of a conical piece of resilient material will not enter a relatively small aperture. Furthermore, when the sealing material is wholly external of the pipe, a lack of proper centering between the leak sealing material and the clamp may result in the leak sealing material being largely squeezed out of the space between the clamp and the pipe so that it is ineffective to seal the leak adequately.

It is an object of this invention to provide a leak sealing device which may be easily and quickly centered with respect to the aperture through which the leak is occurring.

Another object of this invention is to provide a device of the type characterized which can be readily centered with respect to the aperture through which the leak is occurring even though the leak be on the blind side of a pipe or in a relatively dark or inaccessible location.

Another object of this invention is to provide a device of the type characterized wherein the leak sealing element is always centered with respect to the clamping means so as to minimize the likelihood of the sealing material being squeezed out of the space between the clamp and the wall through which the leak occurs.

Another object of this invention is to provide a device of the type characterized wherein the leak sealing element is automatically centered with respect to the aperture through which the leak is occurring so that it does not have to be held in position by the hand while the clamp is being tightened.

Another object of this invention is to provide a device of the type characterized which can be readily used without discomfort in sealing leaks through walls which are at a relatively high temperature.

Another object of this invention is to provide a device of the type characterized which may be readily used in conjunction with containers of fluids under relatively high pressure without releasing the pressure in the container.

Another object of this invention is to provide a device of the type characterized which assures plugging of the aperture through which the leak is occurring as well as effecting a seal around said aperture at the exterior surface of the wall.

Another object of this invention is to provide a device of the type characterized which may be readily adapted to the sealing of leaks in seams, at cracks, etc.

Another object of this invention is to provide a device of the type characterized which may be readily adapted to conditions wherein the clamp, due to the presence of rivets or other interfering projections, cannot be disposed in circumferential alignment with the leak.

Another object of this invention is to provide a device of the type characterized which can be readily provided in a variety of sizes for containers of varying diameters.

Another object of this invention is to provide a device of the type characterized which is inexpensive to produce and compact a structure so that a stock of such devices may be readily kept on hand without large investment or undue consumption of space.

Other objects of this invention will appear as the description of the invention proceeds.

The invention is capable of receiving a variety of mechanical expressions some of which are illustrated on the accompanying drawings, but it is to be expressly understood that the drawings are for purposes of illustration only, and are not to be construed as a definition of the limits of the invention, reference being had to the appended claims for that purpose.

Referring in detail to the accompanying drawings wherein like reference characters are used to designate corresponding parts and wherein devices embodying the present invention are shown to somewhat exaggerated scale to more clearly illustrate the present invention, Fig. 1 is a cross section through a pipe illustrating an embodiment of the present invention in position to seal a leak;

Fig. 2 is a cross sectional view through the pipe and device of Fig. 1 after the leak sealing material has been forced into the leak;

Fig. 3 is a perspective view of the sealing device of Figs. 1 and 2;

Fig. 4 is a view corresponding to Fig. 2 but illustrating another embodiment of the present invention;

Fig. 5 is an exploded view of the sealing elements of yet another embodiment of the present invention; and Fig. 6 is a perspective view of an extension member carrying the leak sealing elements for use with a clamp when the clamp cannot be disposed in circumferential alignment with the leak.

The invention will be illustrated by reference to its use in conjunction with leaks in pipes, but it is to be expressly understood that it is equally applicable to the sealing of leaks in tanks and other cylindrical containers provided the clamp to be described is made of proper size and formation.

Referring first to Figs. 1, 2 and 3, 10 designates a pipe having at 11 an aperture through which leakage occurs. For sealing said leak a leak sealing device is provided which, in compliance with the present invention, includes a spring clamp 12 of any suitable size and construction for embracing the pipe 10 and providing adequate strength to withstand the involved forces required by its use as to be explained. The clamp may be of any suitable thickness and have single or multiple bands, and it may be of any suitable width, varying with the type of leak to be sealed which for purposes of illustration will be assumed to be a single hole. At the extremities of the spring clamp ears 13 of any suitable form and construction are provided and depending on the width of the clamp one or more bolts 14 extend through apertures in said ears, each having its nut 15 which upon tightening will draw the ears 13 toward each other, preferably maintaining substantial parallelism, so as to exert a strong clamping pressure around said pipe.

Slidably mounted on said clamp 12 and retained against displacement therefrom in any suitable way is a carrier 16, shown as provided with any suitable number of tabs 17 which may be bent loosely around the edges of the clamp 12 so as to retain the carrier on the clamp but not interfere with its sliding freely on the clamp. Approximately at the center of said carrier 16 said carrier has an aperture 18, and mounted in said aperture is a washer 19, herein denominated a wafer, which is composed of any suitable heat softenable and vulcanizable sealing material, such as Furmanite, said aperture preferably conforming in size and shape to the wafer to be used. Said wafer may be of any suitable shape and size to provide sufficient sealing material to effect the sealing action to be described, being shown as of cylindrical formation on the order of a half inch in diameter and an eighth inch thick, but a larger or smaller wafer may be used depending on the size and character of the leak to be sealed.

A second washer in the form of a pad 20 is also preferably mounted on said carrier 16 and retained thereon in any suitable way as by the tabs 17. Pad 20 is preferably made of any suitable resilient material which does not soften materially under heat but is yieldable and elastic and herein denominated gasket material, such as vulcanized rubber, leather, or other known yieldable resilient materials commonly used in packings and the like and sold under a variety of trade names. Said pad may be of any suitable size, being shown as of approximately the same size as the carrier, but it may be smaller if preferred, and it may be of any suitable thickness depending upon the amount of resilient backing desired for the sealing material provided by the wafer 19 when the leak is plugged as hereinafter explained. While in the preferred embodiment the pad 20 is made of prevulcanized or comparable material, if preferred it may be made of the same material as the wafer, in one piece or in separate pieces, and within the broader aspects of the present invention the pad may be entirely omitted if a wafer of sufficient size is employed.

The preferred embodiment of the present invention also includes a pin 21 of any suitable material as steel having a head 22 of any suitable size, said pin being here shown as resembling a conventional thumb tack but with a shank of such length that it will nearly if not completely reach through the thickness of the wall through which the leak is occurring. As shown in the embodiment of Figs. 1, 2 and 3, the head 22 of the pin is disposed exteriorly of the pad 20 with its head 22 in contact with the inner surface of the clamp 12 so that its shank extends through both the pad 20 and the wafer 19, centrally of the latter, as shown more particularly in Fig. 1. However, this arrangement is not necessary, as the head of the pin may be disposed between the pad 20 and the wafer 19 as shown in Fig. 5.

In operation, when a leak occurs, the clamp 12 is sprung loosely around the pipe or other container and moved axially and circumferentially, while sliding the carrier 16 thereon to the extent required to engage the pin 21 in the aperture through which the leak is occuring while disposing the ears 13 in a conveniently accessible location for the subsequent tightening of the same. Because of the freedom with which the carrier can be slid with respect to the clamp it is easy to engage the pin in the leak even through the latter be on the blind side of the pipe or in a dark or difficultly accessible location, the entry of the pin into the leak providing a click that can be distinctly noticed. Heat is then applied exteriorly to the clamping device in the neighborhood of the carrier so as to soften the wafer 19, and the clamp is then tightened by the bolt and nut to force the pin 21 further into the aperture through which the leak is occurring and at the same time force the softened vulcanizable material into the leak around the shank of the pin, said vulcanizable material ordinarily exuding through the leak to the inner side of the pipe and there sometimes spreading out somewhat so as to form a head as shown at 23 in Fig. 2. Thereby the shank of the pin partly fills the aperture through which the leak is occurring while the vulcanizable material completes the sealing of the aperture. Pressure applied to the wafer also causes it to spread out somewhat around the leak at the exterior surface of the pipe, so that a seal is effected around the leak as well as in the aperture itself. As the material of the wafer is such that it becomes vulcanized under the continued application of heat, the seal so effected sets promptly and becomes permanent.

As the sealing wafer is carried by the carrier, it obviously does not have to be manually held while properly locating the clamp, and as the carrier can be slid around the clamp to any convenient location with respect to the ears 13 the latter can be disposed at the most convenient location for tightening the clamp while the pin and wafer are properly located with respect to the leak even though the latter be on the blind side of the pipe, or where it cannot be easily seen. Engagement of the pin in the leak automatically centers the wafer with respect to the leak, and as the pin and wafer are centered by the carrier with respect to the clamp, there is no danger of the clamp being improperly aligned with respect to the wafer or the wafer with respect to the leak. As the pin preferably has a sharp point it can be engaged in the smallest leaks, even one just appearing. As the leak sealing element does not have to be manually held while the clamp is being tightened against the pipe the seal may be effected even though the pipe may be uncomfortably hot to the touch, and as the seal may be effected even though the fluid in the pipe be under pressure, because the clamp will hold the sealing elements in position notwithstanding the existence of pressure on the sealing elements, the leak may be sealed without reducing the pressure in the pipe. As the wafer is restrained both by the shank of the pin and by the surrounding wall of the aperture 18, lateral spreading of the material of the wafer as pressure is applied thereto through the clamp is minimized, with assurance that the material of the wafer will be forced into the leak rather than merely spread sidewise under the applied pressure. Once the seal is effected, the clamp constitutes an external metallic reenforcement that assures that the seal will not be blown out of the leak because of any fluid pressure existing within the pipe. Thereby a permanent seal may be easily and quickly effected by one person using only such tools as are commonly available.

While the preferred embodiment of the present invention employs a pin to facilitate centering of the sealing material with respect to the aperture through which the leak is occurring, it is within the contemplation of the present invention to use a leak sealing device as so far described but omitting the pin. Such a construction is shown in Fig. 4 which is identical in all respects with the embodiments of Figs. 1, 2 and 3 except for the omission of the pin, as can be seen from a comparison of Figs. 2 and 4. In Fig. 4 the heat softenable and vulcanizable wafer is shown as forced into and through the aperture 30, forming a plug 31 which completely fills said aperture, and as here illustrated also forming a head 32 interiorly of the pipe, said wafer also spreading out at the exterior face of the pipe to form an exterior seal as in the showing of Fig. 2. Except for the advantages pointed out for the use of the pin, the structure of Fig. 4 has the same advantages as heretofore explained with regard to the embodiment of Figs. 1, 2 and 3, as the carrier 16 may be slid along the clamp so as to be brought into proper alignment with the leak while disposing the ears 13 at a convenient location for tightening the clamp, whereupon a permanent seal may be effected that is reenforced by the clamp so that it cannot be blown out by internal pressure. The carrier 16 in this embodiment also functions to resist spread of the wafer when the clamp is tightened so as to assure entry of the vulcanizable material into the aperture through which the leak is occurring.

Fig. 5 shows a further embodiment utilizing a pin as in the embodiments of Figs. 1 to 3, but in this construction the pin is secured to the pad 20 by the wafer 19 of vulcanizable material, the head 22 of the pin being disposed between the pad and the wafer. This embodiment also includes an additional feature which may be used if desired, to wit, a sheet of perforated metal or screening that may be applied to the pad 20, either at the surface or as an intermediate layer, to constitute reenforcement for the pad. The preferred arrangement is to apply the screen or perforated metal to the inner exterior face of the pad as shown at 36 in Fig. 5, as the screen then not only performs its reenforcing function but also assists in resisting lateral spread of the vulcanizable material when softened and subjected to pressure and therefore increasing the assurance of entry of the vulcanizable material into the leak. If a pin is not used as in the embodiment of Fig. 4 the added resistance to flow of the vulcanizable material afforded by the screen is sometimes desirable.

The constructions so far described are preferred whenever the clamp may be circumferentially aligned with the leak. Sometimes, however, as when using the present invention in connection with a tank having rivets or where the container has a projection in circumferential alignment with the leak, it is not possible to align the clamp circumferentially with the leak, and the clamp therefore has to be located at a circumference which is displaced axially with respect to the circumference including the leak. When such a situation exists the present invention contemplates the use of an extension piece which, if preferred, may be mounted on a carrier as heretofore referred to, but as the extension piece to be described can be applied to the clamp in axial alignment with the leak after the clamp has been located so as to dispose its ears 13 conveniently for tightening, this is ordinarily unnecessary. Referring to Fig. 6, the extension piece is shown as formed of a strip of any suitable metal, such as brass, and of any suitable width and thickness, folded back upon itself so as to provide sections 40, 41 and 42 of any suitable length and spacing. Section 40 is provided with an aperture 44 in which is disposed a wafer 43 like wafer 19 which is backed by a pad 45 held between the sections 40 and 41 and functioning as heretofore described. Although this embodiment may omit the pin as in the embodiment of Fig. 4, a pin 46 is shown in Fig. 6, and its head may be disposed exteriorly of the pad 45 as in the embodiment of Figs. 1 to 3 or be disposed between the pad and the wafer as in the embodiment of Fig. 5. Sections 41 and 42 are suitably spaced and shaped so that they constitute a clip which may be received on the clamp before the clamp is tightened, and hence project from from the clamp to the extent required to bring the wafer 43 with or without its pin 46 into centering relationship with respect to the leak. Thereupon the wafer may be softened by heat and the clamp tightened, forcing the vulcanizable material into the leak as heretofore explained, or external pressure may be applied to the extension piece opposite the wafer so as to aid in forcing the sealing material into the aperture.

While the invention has been illustrated by reference to a leak in the form of a hole, it will now be apparent to those skilled in the art that by changing the shape of the wafer with or without changing the form of the clamp, the invention may also be embodied in forms suitable for leaking seams, cracks and other elongated apertures.

From the foregoing description it will therefore be perceived that the present invention provides a simple and inexpensive leak sealing device that can be readily kept in stock in various sizes so that leaks may be promptly sealed as soon as they start and therefore before continued leakage has eroded the aperture to a large size. The leak sealing device can be readily manipulated by one person without the use of special tools because the slidable carrier for the sealing element or elements enables the leak sealing element or elements to be brought into exact alignment with the leak after the clamp has been sprung onto the container with the ears 13 disposed in a position for convenient access. As the clamp always backs up the leak sealing element or elements it constitutes a reenforcement therefor, whereby a leak can be sealed even though the fluid in the container is under relatively high pressure. Also the sealing of the leak can be effected even though the temperature of the container be relatively high, as the leak sealing element or elements do not have to be held manually against the leak while the clamp is being tightened. When a pin is used as heretofore described, the leak sealing elements are self-centering so as to avoid any possibility, particularly when the leak is not readily observable, that the leak sealing elements are not properly aligned with the leak, and as the leak sealing elements are always held in their proper relationship with respect to the clamp tightening the clamp will not apply unbalanced pressures on the wafer to squeeze the leak sealing material out to one side.

While the embodiments of the invention illustrated on the drawings have been described with considerable particularity it is to be expressly understood that the invention is not to be restricted thereto, as the same may receive a variety of mechanical expressions as will now be apparent to those skilled in the art, while changes may be made in the details of construction, size, arrangement, proportions, and certain features used without others, etc., without departing from the broader aspects of the present invention. Reference is therefore to be had to the claims hereto appended for a definition of said invention.

What is claimed is:

1. In a leak sealing device, the combination of a clamp adapted to embrace a cylindrical container and having means for tightening the same, a carrier slidably mounted on said clamp, and a wafer of heat softenable and vulcanizable material mounted on and movable with said carrier for positioning said material to be forced into a leak upon softening of said material and tightening of said clamp.

2. In a leak sealing device, the combination of a clamp adapted to embrace a cylindrical container and having means for tightening the same, a carrier slidably mounted on said clamp, a pin mounted on and movable with said carrier, and a wafer of heat softenable and vulcanizable material mounted on said pin, said pin and wafer material being movable on said carrier into position for said material to be forced into the leak upon softening of said material and tightening of said clamp.

3. In a leak sealing device, the combination of a clamp adapted to embrace a cylindrical container and having means for tightening the same, a carrier slidably mounted on said clamp, a pad of gasket material mounted on and movable with said carrier, and a wafer of heat softenable and vulcanizable material mounted on said carrier in position to be forced into a leak upon softening of said last named material and tightening of said clamp.

4. In a leak sealing device, the combination of a clamp adapted to embrace a cylindrical container and having means for tightening the same, a carrier slidably mounted on said clamp, a pad of gasket material mounted on and movable with said carrier, a pin on said carrier with its head in engagement with said gasket material, and a wafer of heat softenable and vulcanizable material mounted on said pin, said pin and wafer material being mounted on said carrier for said material to be forced into a leak upon softening of said material and tightening of said clamp.

5. In a leak sealing device, the combination of a clamp adapted to embrace a cylindrical container and having means for tightening the same, a carrier slidably mounted on said clamp, a pad of gasket material on said carrier, a pin mounted on and movable with said carrier, and a wafer of heat softenable and vulcanizable material mounted on said pin, said pin having its head backed by said clamp and extending through both said pad and said wafer.

6. In a leak sealing device, the combination of a clamp adapted to embrace a cylindrical container and having means for tightening the same, a carrier slidably mounted on said clamp, a pad of gasket material on said carrier, a pin mounted on and movable with said carrier, and a wafer of heat softenable and vulcanizable material mounted on said pin, said pin extending through said wafer and having its head disposed between said pad and said wafer.

7. In a leak sealing device, the combination of a clamp adapted to embrace a cylindrical container and having means for tightening the same, a carrier slidably mounted on said clamp, said carrier having a centrally arranged aperture, and a wafer of heat softenable and vulcanizable material carried by and movable with said carrier and located in said aperture.

8. In a leak sealing device, the combination of a clamp adapted to embrace a cylindrical container and having means for tightening the same, a carrier slidably mounted on said clamp, said carrier having a centrally arranged aperture, a wafer of heat softenable and vulcanizable material carried by and movable with said carrier and disposed in said aperture, and a pad of gasket material carried by said carrier and backing said wafer.

9. In a leak sealing device, the combination of a clamp adapted to embrace a cylindrical container and having means for tightening the same, a carrier slidably mounted on said clamp, said carrier having a centrally arranged aperture, a wafer of heat softenable and vulcanizable material carried by and movable with said carrier and disposed in said aperture, and a pin on said carrier and extending through said wafer for engaging the opening of a leak.

10. In a leak sealing device, the combination of a clamp adapted to embrace a cylindrical container and having means for tightening the same, a carrier slidably mounted on said clamp, said carrier having a centrally arranged aperture, a wafer of heat softenable and vulcanizable material carried by and movable with said carrier and disposed in said aperture, a pad of gasket material carried by said carrier and backing said wafer, and a pin extending through at least said wafer for engaging the opening of a leak.

11. In a leak sealing device, the combination of a clamp adapted to embrace a cylindrical container and having means for tightening the same, a movable carrier mounted on said clamp, a wafer of heat softenable and vulcanizable material carried by said carrier, and a pin on said carrier extending through said wafer for locating said wafer with respect to a leak.

12. In a leak sealing device, the combination of a clamp adapted to embrace a cylindrical container and having means for tightening the same, a carrier slidably mounted on said clamp, a wafer of heat softenable and vulcanizable material carried by and movable with said carrier, and a pad of gasket material carried by said carrier and backing said wafer, said pad including a sheet of perforated metal to reenforce the same.

13. In a leak sealing device, the combination of a clamp adapted to embrace a cylindrical container and having means for tightening the same, a carrier mounted on said clamp, a wafer of heat softenable and vulcanizable material carried by and movable with said carrier, a pad of gasket material carried by said carrier and backing said wafer, and a pin on said carrier having its shank extending through said wafer for locating said wafer with respect to a leak.

14. In a leak sealing device, the combination of a clamp adapted to embrace a cylindrical container and including means for tightening the same, and a member slidably mounted on said clamp and carrying a wafer of heat softenable and vulcanizable material adapted to be forced into a leak by the tightening of said clamp.

15. In a leak sealing device, the combination of a clamp adapted to embrace a cylindrical container and including means for tightening the same, and a member slidably mounted on said clamp and carrying a wafer of heat softenable and vulcanizable material adpted to be forced into a leak by the tightening of said clamp, said member extending axially of said clamp so that said wafer may be aligned with a leak laterally disposed with respect to the clamp.

16. In a leak sealing device, the combination of a clamp adapted to embrace a cylindrical container and including means for tightening the same, and a member slidably mounted on said clamp and carrying a wafer of heat softenable and vulcanizable material adapted to be forced into a leak by the tightening of said clamp, said member extending axially of said clamp and including a strip of material folded upon itself to provide a plurality of sections including two sections which are adjacent each other to constitute a clip to be received on said clamp and a third section carrying a wafer of heat softenable and vulcanizable material adapted to be aligned with a leak disposed laterally of the clamp.

17. In a leak sealing device, the combination of a clamp adapted to embrace a cylindrical container and including means for tightening the same, a member slidably mounted on said clamp and carrying a wafer of heat softenable and vulcanizable material adapted to be forced into a leak upon softening of said material and tightening of said clamp, and a pin carried by said wafer for engaging the opening of a leak and centering the wafer with respect thereto.

18. In a leak sealing device, the combination of a clamp adapted to embrace a cylindrical container and including means for tightening the same, a member slidably mounted on said clamp and carrying a wafer of heat softenable and vulcanizable material adapted to be forced into a leak upon softening of said material and tightening of said clamp, a pin carried by and movable with said wafer for engaging the opening of a leak and centering said wafer with respect thereto, and a pad of resilient material carried by said member and backing said wafer.

19. In a leak sealing device, the combination of a clamp adapted to embrace a cylindrical container and including means for tightening the same, and a member slidably mounted on said clamp and carrying a wafer of heat softenable and vulcanizable material adapted to be forced into a leak upon softening of said material and tightening of said clamp, said member including an aperture of substantially the same size as said wafer and in which said wafer is disposed to center and restrain said wafer with respect to said member.

EUGENE C. FURMAN.

REFERENCES CITED

The following references are of record in the file of this patent:

UNITED STATES PATENTS

| Number | Name | Date |
|---|---|---|
| 573,491 | Smith | Dec. 22, 1896 |
| 2,012,935 | Smith et al. | Aug. 27, 1935 |
| 2,069,722 | Merrill | Feb. 3, 1937 |
| 2,377,643 | Nelson | June 5, 1945 |

FOREIGN PATENTS

| Number | Country | Date |
|---|---|---|
| 372,079 | France | Feb. 9, 1907 |
| 40,063 | Norway | Oct. 27, 1924 |